United States Patent [19]

Ornstein

[11] Patent Number: 4,698,270
[45] Date of Patent: Oct. 6, 1987

[54] CORROSION RESISTANT THERMOSTATIC COIL

[75] Inventor: Jacob J. Ornstein, Reidsville, N.C.

[73] Assignee: GTE Products Corporation, Stamford, Conn.

[21] Appl. No.: 931,106

[22] Filed: Nov. 17, 1986

Related U.S. Application Data

[63] Continuation-in-part of Ser. No. 309,620, Oct. 8, 1987, abandoned.

[51] Int. Cl.⁴ .............................................. B32B 15/18
[52] U.S. Cl. ...................................... 428/617; 428/685
[58] Field of Search ...................... 428/616, 617, 685

[56] References Cited

U.S. PATENT DOCUMENTS

| | | | |
|---|---|---|---|
| 1,650,979 | 11/1927 | Brace | 428/617 |
| 3,219,423 | 11/1965 | Sears et al. | 428/617 |
| 4,366,210 | 12/1982 | Golemo, Jr. et al. | 428/617 |
| 4,414,286 | 11/1983 | Ty | 428/616 |

FOREIGN PATENT DOCUMENTS 22585  8/1979  Japan ................................. 428/617

Primary Examiner—L. Dewayne Rutledge
Assistant Examiner—Robert L. McDowell
Attorney, Agent, or Firm—James Theodosopoulos

[57] ABSTRACT

A spiral thermostatic coil is made from a four layer thermostatic metal comprising relatively thick intermediate LES and HES layers bonded to each other, a low expansion, corrosion-resistant, relatively thin metal layer bonded to the LES layer, and a high expansion, corrosion-resistant relatively thin metal layer bonded to the HES layer. The flexivity is reduced less than about 10% by the corrosion-resistant layers.

3 Claims, 1 Drawing Figure

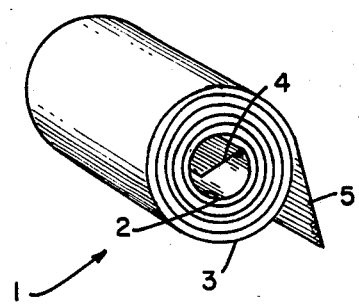

CORROSION RESISTANT THERMOSTATIC COIL

This application is a continuation-in-part of Ser. No. 309,620, filed 10/8/81 now abandoned.

This invention is concerned with spiral thermostatic coils. Such coils comprise a high expansion metal bonded to a low expansion metal.

This invention is particularly concerned with the use of such spiral thermostatic coils in an atmosphere which would corrode the coil over a period of time. An example of such use is in a water faucet where it would be desired that the coil restrict water flow if the water became too hot. Commonly used thermostatic metals would not have adequate corrosion resistance for such an application. And prior art corrosion resistant thermostatic metals would not have sufficient flexivity for desirable valve operation in such an application. This invention discloses a thermostatic coil that overcomes the prior art problems.

BRIEF DESCRIPTION OF THE DRAWING

The FIGURE shows a spiral thermostatic coil.

A spiral thermostatic coil in accordance with this invention is made of a thermostatic metal comprising a high expansion (HE) layer of 22% nickel, 3% chromium, balance iron, metallurgically bonded to an equally thick low expansion (LE) layer of 36% nickel, balance iron. In this specification, all alloy compositions are in weight percent. In order to provide desired corrosion resistance, the LE layer has a thin layer of a corrosion resistant low expansion alloy of 38 nickel, 7 chromium, balance iron, metallurgically bonded thereto and the HE layer has a thin layer of a corrosion resistant high expansion alloy of 19 nickel, 7 chromium, balance iron, metallurgically bonded thereto. In order to not significantly reduce flexivity, the thickness of each corrosion resistant layer should be about 5% of the total thickness of the thermostatic metal. For proper operation, the thermostatic metal is formed into a spiral coil with the LE layer on the inner surface. Thus, the coil will contract when heated, when the inner end of the coil is fixed to prevent movement of said inner end.

The nominal flexivity of a thermostatic metal (type 2400) comprising 22 Ni- 3Cr- balance Fe metallurgically bonded to 36 Ni- balance Fe is $14.6 \times 10^{-6}$ inch per inch per degree Fahrenheit. With the above identified corrosion resistant layers bonded to the type 2400 thermostatic metal, the flexivity is decreased less than 10%, to $13.4 \times 10^{-6}$.

In one embodiment of this invention coil 1 was made from a length of 15 mil thick Chace E263 metal that was 9.5 inches long by 0.75 inches wide, a length to width ratio of $12\frac{2}{3}$. Inner turn 2 of coil 1 had a diameter of about $\frac{1}{4}$ inch and outer turn 3 had a diameter of about $\frac{5}{8}$ inch. There was a diametral straight leg 4 at the center of coil 1 for the purpose of being fixedly attached in a valve assembly into which coil 1 would be placed. At the end of outer turn 3 there was a short straight section 5 which was movable as coil 5 expanded and contracted with temperature changes. In operation, straight section 5 would be operative, in response to temperature changes of the fluid, to move a valve member to open or close an opening in a valve body through which fluid would flow. There were about six turns, equidistantly spaced apart, in coil 1.

The composition of the four layer 15 mil thick Chace E263 thermostatic metal starting at the outer surface of coil 1 was as follows: An LE layer about 0.75 mils thick of 38 Ni-7Cr-balance Fe bonded to an LE layer about 6.75 thick of 36 Fe bonded to an HE layer about 6.75 mils thick of 22 Ni- 3Cr- balance Fe bonded to an HE layer about 0.75 mils thick of 19 Ni- 7Cr-balance Fe.

The operating characteristics of coil 1 were as follows:

Deflection: 0.65° rotation per °F.;

Torque: 0.16 ounce-inches per degree rotation.

These operating characteristics permitted the coil to properly perform its function of controlling fluid flow. For such purpose, the thickness of the thermostatic metal can be about 12 to 18 mils; the length to width ratio of the metal can be between about 12:1 to 20:1.

I claim:

1. A thermostatic coil comprising a four layer thermostatic metal having a coiled spiral shape and having an inner end and an outer end, the four layer thermostatic metal comprising a low expansion layer of 36Ni-balance Fe metallurgically bonded to a high expansion layer of about equal thickness of 22Ni-3Cr- balance Fe, said low expansion layer having metallurgically bonded thereto a thinner low expansion layer of a corrosion resistant alloy of 38Ni-7Cr-balance Fe, the thickness of said thinner low expansion layer being about 5% of the total thickness of the four layer thermostatic metal, said high expansion layer having metallurgically bonded thereto a thinner high expansion layer of a corrosion resistant alloy of 19Ni-7Cr balance Fe, the thickness of said thinner high expansion layer being about 5% of the total thickness of the four layer thermostatic metal, the thinner low expansion layer being on the outer surface of the coil so that when the coil is heated with the inner end of the coil fixed to prevent movement thereof, the coil will expand.

2. The coil of claim 1 wherein the four layer thermostatic metal is about 12 to 18 mils thick.

3. The coil of claim 1 wherein the coil is made from a length of four layer thermostatic metal having a length to width ratio of between about 12:1 to 20:1.

* * * * *